Patented Sept. 5, 1939

2,172,192

UNITED STATES PATENT OFFICE 2,172,192

PHOTOGRAPHIC DESENSITIZING

Walter Dieterle, Dessau-Ziebigk, and Sebastian Gassner, Leverkusen, Germany, assignors, by mesne assignments, to Agfa Ansco Corporation, Binghamton, N. Y., a corporation of Delaware No Drawing. Application June 8, 1938, Serial No. 212,498. In Germany June 12, 1937

7 Claims. (Cl. 95—88)

Our present invention relates to an improved process for desensitizing light-sensitive silver halide emulsions.

It is known that photographic emulsions may be desensitized by derivatives of anthraquinone as, for instance, by the taurides of anthraquinone carboxylic acids or sulfonic acids and by anthraquinone acid amides in which at least one hydrogen atom of the amino-group is exchanged for a radical which carries a sulfonic acid or carboxylic acid group.

It is one object of our present invention to provide a process of desensitizing light-sensitive silver halide emulsions in which there is used as desensitizer a sulfonated ether of anthraquinone having aliphatic, aromatic or heterocyclic radicals.

A further object of our invention is the provision of a process of desensitizing silver halide emulsions, the desensitizer being a sulfonated thioether of anthraquinone having aliphatic, aromatic or heterocyclic radicals.

A still further object of the invention is to provide a process of desensitizing silver halide emulsions in which there is used as desensitizer an ether or thioether of anthraquinone with aliphatic, aromatic or heterocyclic radicals and at least one sulfonic acid group in the anthraquinone nucleus and/or said radicals.

Yet another object of the invention is to provide baths and developers containing such sulfonated ethers or thioethers.

Other objects of the invention will appear from the description following hereinafter.

The desensitizers used according to the invention present a number of advantages.

In the first place, they have very good solubility in water. They are not flocculated by the alkali salt of the developer. Their densitizing action is surprising. Moreover, the developers containing such desensitizers are more permanent when stored in air than when they contain one of the hitherto known desensitizers of the anthraquinone class.

The desensitizers may be used in a preliminary bath, but their superiority is particularly apparent when they are added to the developer.

The following examples illustrate the invention but they are not intended to limit it thereto.

Example 1

1 gram of sodium anthraquinone-2-phenoxy-2'.4'-disulfonate of the following formula

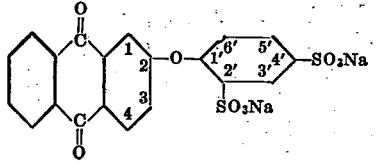

which is obtainable by condensing 2-chloro-anthraquinone with phenol in the presence of potassium carbonate, sulfonating the 2-phenoxy-anthraquinone thus produced in concentrated sulfuric acid containing 20 per cent of sulfur trioxide at 100° C., and transforming the sulfonic acid obtained into the sodium salt, is dissolved in 30 cc. of warm water and added to 1 liter of the following developer:

1000 grams of water
8 grams of 1-hydroxy-4-methylaminobenzene-sulfate
125 grams of anhydrous sodium sulfite
5.8 grams of anhydrous sodium carbonate
2.5 grams of potassium bromide.

Orthochromatic and panchromatic material is developed for 1 minute in the dark and may then be completely developed in bright green or yellow light.

Example 2

2 grams of sodium anthraquinone-2-phenoxy-4'-mono-sulfo-3-sulfonate of the following formula

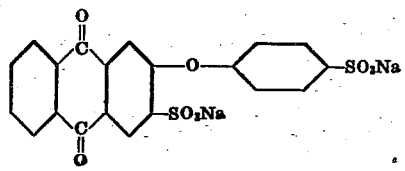

which is produced by causing potassium 2-chloro-anthraquinone-3-sulfonate to react with phenol in aqueous solution in the presence of sodium carbonate, drying the product obtained, sulfonating it with concentrated sulfuric acid containing 5 per cent of sulfur trioxide, and transforming the sulfonic acid thus produced into the sodium salt, are dissolved in 50 cc. of warm water and added to 1 liter of a developer containing essentially monomethyl-p-aminophenol, hydroquinone and borax as the alkali ready for use. Orthochromatic and panchromatic layers are developed in this developer for 1.5 minutes in the dark and for the remainder in bright green or yellow light.

Example 3

1 liter of a concentrated caustic alkaline solution of 1-hydroxy-4-aminobenzene is mixed with a solution of 0.6 gram of the substance named in Example 1, dissolved in 20 cc. of water at 30° C. For use the developer is diluted with water in a proportion of 1:20. Panchromatic material is developed in this developer for 2 minutes in the dark and for the remaining period in a spectrally pure blue-green light. The negative may be examined shortly several times in this relatively bright light.

Example 4

Instead of the compounds named in Examples 1–3, the sodium anthraquinone-2-thioethane-ω-sulfo-3-sulfonate may be used, which has the following formula

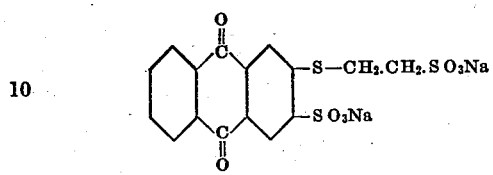

and may be produced by causing potassium 2-chloro-anthraquinone-3-sulfonate to react with a solution of sodium persulfide and alkylating the mercaptan obtained with sodium chloroethane sulfonate in aqueous solution.

Example 5

Instead of the compounds named in Examples 1–3, there may be used the sodium anthraquinone-2-thioethane-ω-sulfonate of the following formula

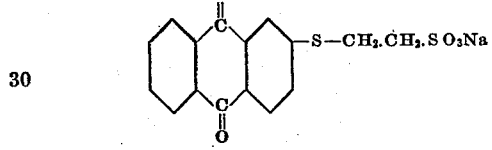

which is obtainable by condensing sodium anthraquinone-2-sulfonate with a solution of sodium persulfide with heating under pressure and alkylating the mercaptan thus produced with sodium chloroethane sulfonate.

Example 6

Instead of the compounds named in Examples 1–3, there may be used the sodium anthraquinone-2-thiophenol-4'-mono-sulfo-3-sulfonate of the formula

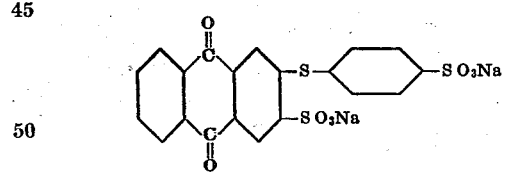

which may be produced by causing potassium 2-chloro-anthraquinone-3-sulfonate with an aqueous solution of thiophenol in the presence of sodium carbonate, sulfonating the phenyl-mercapto derivative thus obtained in concentrated sulfuric acid containing some sulfur trioxide, and transforming the sulfuric acid produced into the sodium salt.

Example 7

A desensitizer of the following constitution

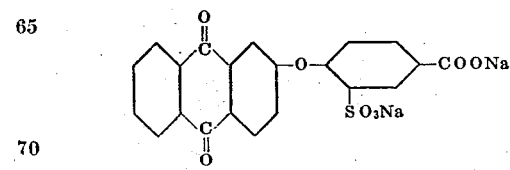

may be produced by sulfonating a condensation product from 2-chloro-anthraquinone and 4-hydroxybenzoic acid and transforming the product obtain into the sodium salt.

Example 8

A desensitizer having the following constitution

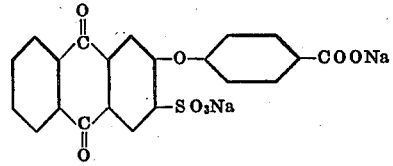

may be produced by condensing 2-chloro-anthraquinone-3-sulfonic acid with 4-hydroxybenzoic acid and transforming the product obtained into the sodium salt.

Example 9

A desensitizer of the following formula

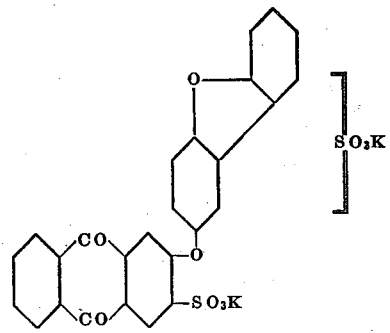

is obtained by condensing potassium 2-chloro-anthraquinone-3-sulfonate with 3-hydroxy-diphenyleneoxide in a pressure vessel in the presence of potassium carbonate and a little copper, after-sulfonating the product obtained by means of concentrated sulfuric acid containing 20 per cent of sulfur trioxide, and transforming the sulfonic acid produced into the potassium salt.

Example 10

A desensitizer of the constitution

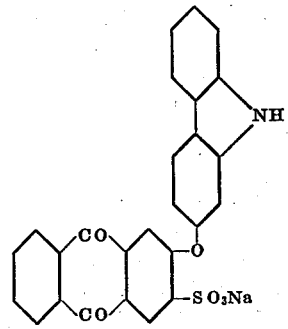

is produced by condensing potassium 2-chloro-anthraquinone-3-sulfonate with 2-hydroxy-carbazole in water with heating under pressure at 150° C. and transforming the product thus obtained into the sodium salt.

Example 11

A desensitizer having the following formula

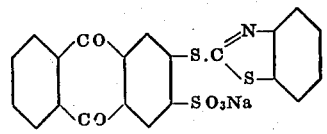

may be produced by causing potassium 2-chloro-anthraquinone-3-sulfonate to react with 2-mercaptobenzthiazole in water in the presence of potassium carbonate with heating under pressure and transforming the product obtained into the sodium salt.

Two or more of the desensitizers above defined may be used together.

We claim:

1. In a process of desensitizing a light sensitive silver halide emulsion the step which comprises treating said emulsion with an aqueous solution of a compound selected from the class consisting of ethers and thioethers, the ether atom of said compound being linked on one side to an anthraquinone nucleus and on the other side to a member selected from the class consisting of aliphatic radicals, aromatic radicals, and heterocyclic radicals, said compound containing at least one member selected from the class consisting of SO₃Na and SO₃K.

2. As a desensitizer for a light sensitive silver halide emulsion a compound selected from the class consisting of ethers and thioethers, the ether atom of said compound being linked on one side to an anthraquinone nucleus and on the other side to a member selected from the class consisting of aliphatic radicals, aromatic radicals, and heterocyclic radicals, said compound containing at least one member selected from the class consisting of SO₃Na and SO₃K in aqueous solution.

3. A bath for desensitizing a light sensitive silver halide emulsion comprising an aqueous solution of a compound selected from the class consisting of ethers and thioethers, the ether atom of said compound being linked on one side to an anthraquinone nucleus and on the other side to a member selected from the class consisting of aliphatic radicals, aromatic radicals, and heterocyclic radicals, said compound containing at least one member selected from the class consisting of SO₃Na and SO₃K.

4. A developer for light sensitive silver halide emulsions comprising an aqueous solution of developing agents for silver halide emulsions and a compound selected from the class consisting of ethers and thioethers, the ether atom of said compound being linked on one side to an anthraquinone nucleus and on the other side to a member selected from the class consisting of aliphatic radicals, aromatic radicals, and heterocyclic radicals, said compound containing at least one member selected from the class consisting of SO₃Na and SO₃K.

5. In a process of desensitizing a light sensitive silver halide emulsion the step which comprises treating said emulsion with an aqueous solution of sodium anthraquinone-2-phenoxy-2'.4'-disulfonate.

6. In a process of desensitizing a light sensitive silver halide emulsion the step which comprises treating said emulsion with an aqueous solution of sodium anthraquinone-2-thioethane-ω-sulfo-3-sulfonate.

7. In a process of desensitizing a light sensitive silver hadile emulsion the step which comprises treating said emulsion with an aqueous solution of the potassium salt of a sulfonation product of a compound having the formula:

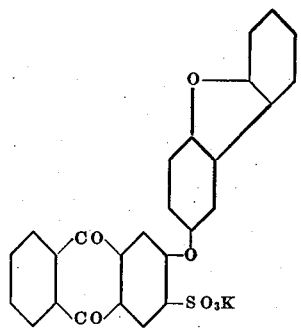

WALTER DIETERLE.
SEBASTIAN GASSNER.